United States Patent
Zhou et al.

(10) Patent No.: US 12,429,615 B1
(45) Date of Patent: Sep. 30, 2025

(54) QUANTITATIVE EVALUATION METHOD FOR HYDRAULIC FRACTURES IN NEAR-WELLBORE REGION

(71) Applicant: Institute of Geology and Geophysics, Chinese Academy of Sciences, Beijing (CN)

(72) Inventors: Xuhui Zhou, Beijing (CN); Shoudong Huo, Beijing (CN); Shengqiang Mu, Beijing (CN); Guoxu Shu, Beijing (CN); Liang Huang, Beijing (CN); Jiangyun Zhang, Beijing (CN); Wenchao Su, Beijing (CN); Mingran Liu, Beijing (CN)

( * ) Notice: Subject to any disclaimer, the term of this patent is extended or adjusted under 35 U.S.C. 154(b) by 0 days.

(21) Appl. No.: 19/008,322

(22) Filed: Jan. 2, 2025

(30) Foreign Application Priority Data

Jun. 24, 2024 (CN) .......................... 202410820723.X (51) Int. Cl.
| | |
|---|---|
| *G01V 1/30* | (2006.01) |
| *E21B 43/26* | (2006.01) |
| *E21B 49/00* | (2006.01) |
| *G01V 1/22* | (2006.01) |
| *G01V 1/28* | (2006.01) |

(52) U.S. Cl.
CPC .............. *G01V 1/301* (2013.01); *E21B 49/00* (2013.01); *G01V 1/226* (2013.01); *G01V 1/282* (2013.01); *E21B 43/26* (2013.01); *E21B 2200/20* (2020.05); *G01V 2210/646* (2013.01)

(58) Field of Classification Search
CPC ........ G01V 1/301; G01V 1/226; G01V 1/282; G01V 2210/646; E21B 49/00; E21B 43/26; E21B 2200/20
See application file for complete search history.

(56) References Cited

U.S. PATENT DOCUMENTS

| | | | |
|---|---|---|---|
| 2017/0145793 A1 | 5/2017 | Ouenes | |
| 2022/0025753 A1* | 1/2022 | Heidari | ................. E21B 49/005 |
| 2022/0307371 A1* | 9/2022 | Swan | ..................... E21B 49/008 |

(Continued)

FOREIGN PATENT DOCUMENTS

| | | |
|---|---|---|
| CN | 110331973 A | 10/2019 |
| CN | 112780256 A | 5/2021 |

(Continued)

OTHER PUBLICATIONS

Carey et al., Analysis of Water Hammer Signatures for Fracture Diagnostics, 2015, Society of Petroleum Engineers, SPE-174866-MS, pp. 1-25 (Year: 2015).*

(Continued)

*Primary Examiner* — Mi'schita' Henson (57) ABSTRACT

A method for determining hydraulic fractures in the near-wellbore region, comprising the following steps: constructing a model with hydraulic fractures, a wellbore, and a formation as main components, and discretizing the model using non-uniform grid technology. This data subset is inverted using the time-lapse full-waveform inversion (TL-FWI) algorithm to achieve high-precision reconstruction of the hydraulic fractures and to obtain key attributes such as fracture-wellbore connectivity, extent of fracture propagation, and fracture geometry.

5 Claims, 2 Drawing Sheets

(56) References Cited

U.S. PATENT DOCUMENTS

2023/0147476 A1* 5/2023 Wheelock ............... G01V 1/46
367/82

FOREIGN PATENT DOCUMENTS

| CN | 116519455 A | 8/2023 |
|---|---|---|
| CN | 117365462 A | 1/2024 |

OTHER PUBLICATIONS

Chao Liang et al., Hydraulic fracture diagnostics from Krauklis-wave resonance and tube-wave reflections, May 1, 2017, Society of Exploration Geophysicists, ISN 0016-8033, vol. 82, issue 3, pp. D171-D186 (Year: 2017).*
Cai Haiwen, Ye Qing, Wang Zhaoyong, Lu Bin, <Distributed Optical Fiber Acoustic Sensing Technology Based on Coherent Rayleigh Scattering> <Laser & Optoelectronics Progress,>, Mar. 2020, entire ducument, vol. 57, No. 5.

* cited by examiner

QUANTITATIVE EVALUATION METHOD FOR HYDRAULIC FRACTURES IN NEAR-WELLBORE REGION

TECHNICAL FIELD

The present disclosure belongs to the technical field of near-wellbores, and particularly relates to a quantitative evaluation method for hydraulic fractures in the near-wellbore region.

BACKGROUND OF THE INVENTION

As the production from conventional oil and gas reservoirs continues to decline, the importance of unconventional reservoirs has gradually become more prominent. In this context, hydraulic fracturing technology has become a key method for enhancing the extraction efficiency of unconventional reservoirs. Hydraulic fracturing increases the connectivity of unconventional reservoirs, effectively releasing oil and gas resources from the reservoir. Particularly in the near-wellbore region, the effectiveness of hydraulic fracturing directly impacts the connectivity between the oil and gas in the far-field and the wellbore, thereby influencing the well's production rate.

Currently, microseismic monitoring using distributed acoustic sensing (DAS) data, as well as strain rate response inversion based on low-frequency DAS (LF-DAS) data, have become the primary methods for evaluating hydraulic fractures. Although microseismic monitoring is mainly used for qualitative analysis of hydraulic fractures, there are certain challenges in quantitatively assessing key attributes such as the connectivity between hydraulic fractures and the wellbore, the extent of fracture propagation, and their geometric characteristics. In contrast, while LF-DAS inversion methods can quantitatively assess hydraulic fractures in the far-field, they face significant difficulties in monitoring hydraulic fractures in the near-wellbore region (i.e., within a few meters from the wellbore to the formation). Therefore, there is an urgent need for a method capable of accurately characterizing hydraulic fractures in the near-wellbore region to address this challenge.

SUMMARY OF THE INVENTION

The objective of the present invention is to provide a quantitative evaluation method for hydraulic fractures in the near-wellbore region. This method aims to address the issue that existing microseismic monitoring technology using distributed acoustic sensing (DAS) data, as well as strain rate response inversion methods based on low-frequency DAS (LF-DAS) data, cannot quantitatively assess hydraulic fractures in the near-wellbore region. Although microseismic monitoring technology is primarily used for qualitative analysis of hydraulic fractures, there are challenges in quantitatively evaluating key attributes such as the connectivity between hydraulic fractures and the wellbore, the extent of fracture propagation, and geometric characteristics. In contrast, while LF-DAS inversion methods can quantitatively assess hydraulic fractures in the far-field, they face significant difficulties in monitoring hydraulic fractures in the near-wellbore region (i.e., within a few meters from the wellbore to the formation).

To achieve the above objective, the present invention provides the following technical solution: a quantitative evaluation method for hydraulic fractures in the near-wellbore region, including the following steps:

Step 1, constructing a model with hydraulic fractures, a wellbore, and a formation as main components, and discretizing the model using non-uniform grid technology;

Step 2, obtaining a time-lapse DAS response data subset: first, calculating a component of a particle velocity $$v_x$$

along a fiber installation direction based on an anisotropic elastic wave equation; then, determining a DAS strain rate response $$\dot{\varepsilon}_{xx}$$

by taking a derivative of the particle velocity component along a fiber direction; finally, calculating strain rate responses before $$\dot{\varepsilon}_{xx}^{before}$$

and after $$\dot{\varepsilon}_{xx}^{after}$$

fracturing, and obtaining the time-lapse DAS response data subset $$\dot{\varepsilon}_{xx}^{TL\_syn}$$

in the synthetic data by subtracting the two;

Step 3, after completing Step 2, inverting the time-lapse DAS response data subset: first, obtaining the time-lapse DAS response data subset $$\dot{\varepsilon}_{xx}^{TL\_obs}$$

from the field data; then, constructing a TL-FWI error function, and calculating a gradient of an objective function using gradient-based methods; finally, updating an initial model based on the gradient of the objective function until an TL-FWI error reaches a predefined threshold, at which point the development of hydraulic fractures in the near-wellbore region can be obtained;

Step 4, performing quantitative evaluation on the hydraulic fractures in the near-wellbore region by the conclusion obtained after Step 3 is completed.

In the quantitative evaluation method for hydraulic fractures in the near-wellbore region of the present disclosure, preferably, in Step 1, the hydraulic fracture region is discretized using a finer grid, the wellbore region is discretized using a medium grid, and the formation region is discretized using a coarse grid.

In the quantitative evaluation method for hydraulic fractures in the near-wellbore region of the present disclosure, preferably, in Step 2, based on discretizing the model using non-uniform grids, the anisotropic medium elastic wave equation is used to solve for the DAS response, and the anisotropic medium elastic wave equation is expressed as follows:

$$\begin{cases} \rho \dfrac{\partial v_x}{\partial t} = \dfrac{\partial \sigma_{xx}}{\partial x} + \dfrac{\partial \sigma_{xz}}{\partial z} \\ \rho \dfrac{\partial v_z}{\partial t} = \dfrac{\partial \sigma_{zz}}{\partial z} + \dfrac{\partial \sigma_{xz}}{\partial x} \\ \dfrac{\partial \sigma_{xx}}{\partial t} = c_{11} \dfrac{\partial v_x}{\partial x} + c_{13} \dfrac{\partial v_z}{\partial z} \\ \dfrac{\partial \sigma_{zz}}{\partial t} = c_{13} \dfrac{\partial v_x}{\partial x} + c_{33} \dfrac{\partial v_z}{\partial z} \\ \dfrac{\partial \sigma_{xz}}{\partial t} = c_{44} \dfrac{\partial v_x}{\partial z} + c_{44} \dfrac{\partial v_z}{\partial x} \end{cases}$$

In the quantitative evaluation method for hydraulic fractures in the near-wellbore region of the present disclosure, preferably, in the anisotropic medium elastic wave equation, $$c_{11}, c_{13}, c_{33}, c_{44}$$

are the anisotropic elastic parameters, and $$v_x, v_z$$

are the horizontal and vertical components of the particle velocity. By applying a water hammer signal at a wellhead and solving an anisotropic media elastic wave equation, horizontal component data $$v_x$$

of the particle velocity along the fiber installation direction in a horizontal well is acquired, and the DAS strain rate response $$\dot{\varepsilon}_{xx}$$

is acquired by the following formula:

$$\dot{\varepsilon}_{xx} = \dfrac{\partial v_x}{\partial x}.$$

In the quantitative evaluation method for hydraulic fractures in the near-wellbore region of the present disclosure, preferably, $$\partial x$$

represents the partial derivative along the horizontal direction, i.e., the partial derivative along the fiber direction, and through the above formula, the DAS strain rate response is obtained from the anisotropic elastic wave equation.

In the quantitative evaluation method for hydraulic fractures in the near-wellbore region of the present disclosure, preferably, the time-lapse DAS response data subset dominated by Krauklis waves is obtained by the technology of Steps 1-2, on the basis, the time-lapse DAS response data subset $$\dot{\varepsilon}_{xx}^{TL\_obs}$$

in the field data is acquired in the same way, based on synthetic data $$\dot{\varepsilon}_{xx}^{TL\_obs}$$

and the field data $$\dot{\varepsilon}_{xx}^{TL\_syn},$$

the objective function of TL-FWI is constructed and is shown as the following formula:

$$\delta \dot{\varepsilon}_{xx} = \dot{\varepsilon}_{xx}^{TL\_obs} - \dot{\varepsilon}_{xx}^{TL\_syn}$$
$$E(m) = \sum_{shots} \dfrac{1}{2} \int dt \sum_{receivers} \delta \dot{\varepsilon}_{xx}^2.$$

In the quantitative evaluation method for hydraulic fractures in the near-wellbore region of the present disclosure, preferably, $$\delta \dot{\varepsilon}_{xx}$$

is a data residual, $$E(m)$$

is an objective function of TL-FWI, m is a model parameter, i.e., anisotropic elastic parameters and density. A derivative $$\dfrac{\partial E}{\partial m}$$

of the objective function is obtained by a gradient-based algorithm and the model is updated by the following formula:

$$m_{n+1} = m_n - \mu_n \dfrac{\partial E}{\partial m}.$$

In the quantitative evaluation method for hydraulic fractures in the near-wellbore region of the present disclosure, preferably, $$m_n$$

is a model obtained after n-th iteration, $$m_{n+1}$$

is a new model updated based on the n-th model, and $$\mu_n$$

is an update step size. When the error of TL-FWI is less than a certain threshold, the time-lapse variation of the hydraulic fracture is obtained.

Compared with the prior art, the beneficial effects of the present disclosure are:

The objective of the present invention is to address the difficulty in quantitatively evaluating hydraulic fractures in the near-wellbore region. By fully utilizing the advantages of distributed acoustic sensing (DAS) data, such as full-well coverage and wide-angle reception, and combining time-lapse inversion strategies, the invention aims to extract data subsets containing Krauklis wave responses by utilizing the time-lapse response differences in DAS data recorded before and after fracturing. This data subset is inverted using the time-lapse full-waveform inversion (TL-FWI) algorithm to achieve high-precision reconstruction of the hydraulic fractures and to obtain key attributes such as fracture-wellbore connectivity, extent of fracture propagation, and fracture geometry. This allows for the quantitative evaluation of hydraulic fractures in the near-wellbore region. Through the research of this invention, we aim to promote the transition of Krauklis waves from theory to practical application, significantly enhancing the understanding of complex fracture propagation in underground reservoirs. This will enable the formulation of more effective operational decisions and production strategies, advancing hydraulic fracturing monitoring technology and improving the effectiveness of hydraulic fracturing.

BRIEF DESCRIPTION OF DRAWINGS

The accompanying drawings are included to provide a further understanding of the disclosure and constitute a part of this specification and together with embodiments thereof serve to explain the disclosure and are not to be construed as limiting the disclosure. In the drawings.

DETAILED DESCRIPTION OF THE INVENTION

The technical solutions in the embodiments of the present disclosure will be clearly and completely described below in conjunction with the accompanying drawings in the embodiments of the present disclosure, it is obvious that the described embodiments are only a part of the embodiments of the present disclosure, rather than all of the embodiments. Based on the embodiments in the present disclosure, all other embodiments obtained by those of ordinary skill in the art without making inventive labor, belong to the scope of protection of the present disclosure.

Figure 1:
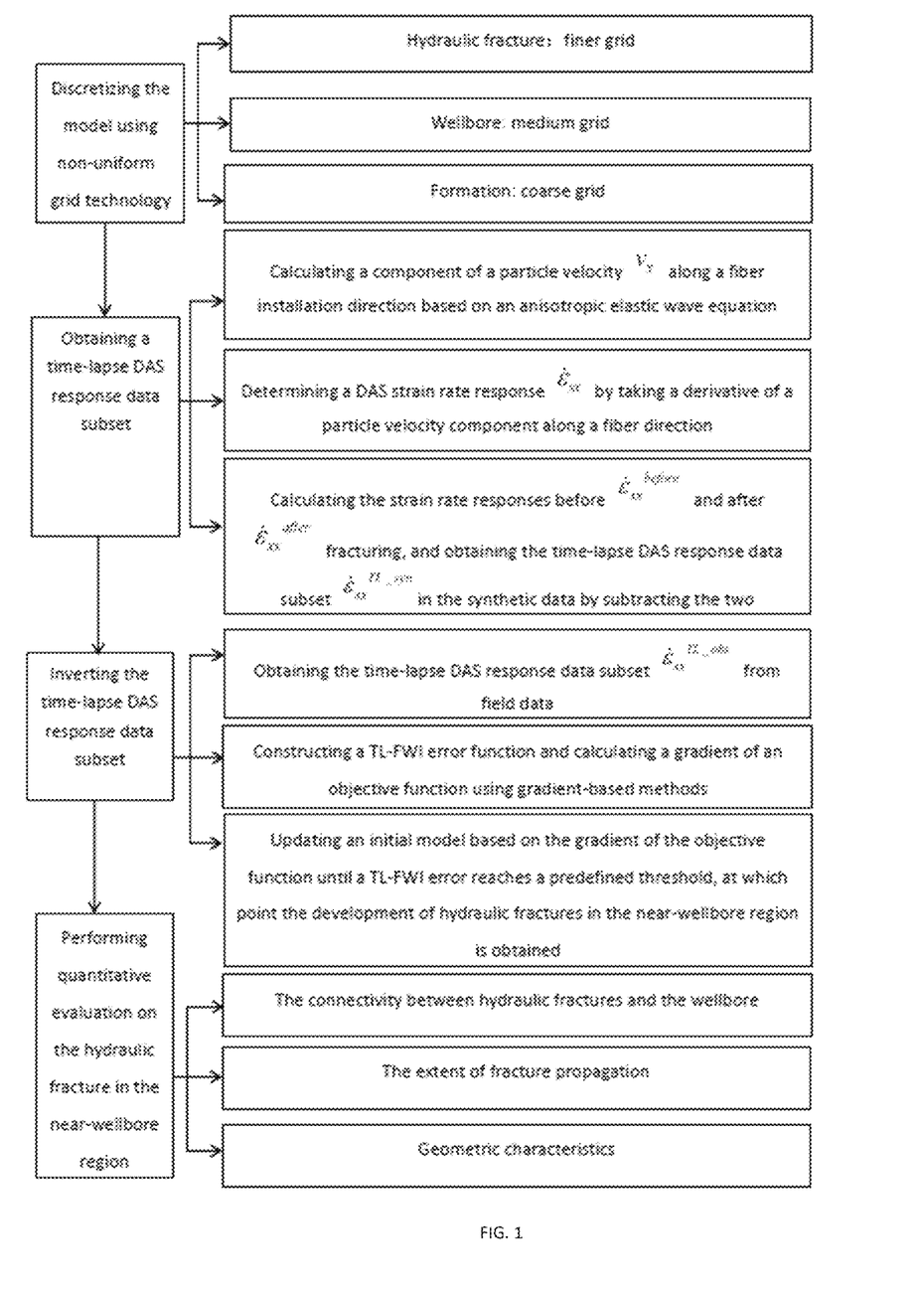
FIG. 1 is a schematic flow diagram of the present disclosure.
Figure 2:
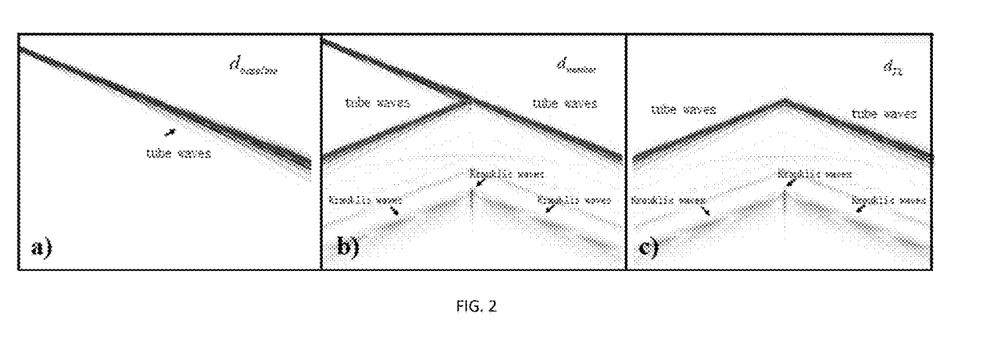
FIG. 2 is a schematic diagram of a) data before fracturing; b) data after fracturing; and c) a time-lapse response data subset according to the present disclosure.

Referring to FIGS. 1-2, the present disclosure provides the following technical solution: a quantitative evaluation method for hydraulic fractures in the near-wellbore region includes the steps of:

Step 1, a model with hydraulic fractures, a wellbore, and a formation as main components is constructed, and the model is discretized using non-uniform grid technology;

Step 2, a time-lapse DAS response data subset is obtained: first, a component of a particle velocity $$v_x$$

along a fiber installation direction is calculated based on an anisotropic elastic wave equation; then, a DAS strain rate response $$\dot{\varepsilon}_{xx}$$

is determined by taking a derivative of the particle velocity component along a fiber direction; finally, the strain rate responses before $$\dot{\varepsilon}_{xx}^{before}$$

and after $$\dot{\varepsilon}_{xx}^{after}$$

fracturing are calculated, and the time-lapse DAS response data subset $$\dot{\varepsilon}_{xx}^{TL\_syn}$$

in synthetic data is obtained by subtracting the two;

Step 3, after Step 2 is completed, the time-lapse DAS response data subset is inverted: first, the time-lapse DAS response data subset $$\dot{\varepsilon}_{xx}^{TL\_obs}$$

from field data is obtained; then, a TL-FWI error function is constructed, and a gradient of the objective function is calculated using gradient-based methods; finally, an initial model is updated based on the gradient of the objective function until the TL-FWI error reaches a predefined threshold, at which point the development of hydraulic fractures in the near-wellbore region can be obtained; and Step 4, quantitative evaluation is performed on the hydraulic fractures in the near wellbore region by the conclusion obtained after Step 3 is completed.

Preferably, in Step 1, the hydraulic fracture region is discretized using a finer grid, the wellbore region is discretized using a medium grid, and the formation region is discretized using a coarse grid.

Preferably, in Step 2, based on discretizing the model using non-uniform grids, the anisotropic medium elastic wave equation is used to solve for the DAS response, and the anisotropic medium elastic wave equation is expressed as follows:

$$\begin{cases} \rho \dfrac{\partial v_x}{\partial t} = \dfrac{\partial \sigma_{xx}}{\partial x} + \dfrac{\partial \sigma_{xz}}{\partial z} \\ \rho \dfrac{\partial v_z}{\partial t} = \dfrac{\partial \sigma_{zz}}{\partial z} + \dfrac{\partial \sigma_{xz}}{\partial x} \\ \dfrac{\partial \sigma_{xx}}{\partial t} = c_{11} \dfrac{\partial v_x}{\partial x} + c_{13} \dfrac{\partial v_z}{\partial z} \\ \dfrac{\partial \sigma_{zz}}{\partial t} = c_{13} \dfrac{\partial v_x}{\partial x} + c_{33} \dfrac{\partial v_z}{\partial z} \\ \dfrac{\partial \sigma_{xz}}{\partial t} = c_{44} \dfrac{\partial v_x}{\partial z} + c_{44} \dfrac{\partial v_z}{\partial x} \end{cases}.$$

In the anisotropic medium elastic wave equation, $$c_{11}, c_{13}, c_{33}, c_{44}$$

are the anisotropic elastic parameters, and $$v_x, v_z$$

are the horizontal and vertical components of the particle velocity. By applying a water hammer signal at a wellhead and solving an anisotropic media elastic wave equation, horizontal component data $$v_x$$

of the particle velocity along the fiber installation direction in a horizontal well is acquired, and the DAS strain rate response $$\dot{\varepsilon}_{xx}$$

is acquired by the following formula:

$$\dot{\varepsilon}_{xx} = \dfrac{\partial v_x}{\partial x}.$$

$$\partial x$$

represents the partial derivative along the horizontal direction, i.e., the partial derivative along the fiber direction, and through the above formula, the DAS strain rate response is obtained from the anisotropic elastic wave equation.

In specific use, the DAS strain rate response $$\dot{\varepsilon}_{xx}^{before}$$

before fracturing is obtained (FIG. 2a), and after fracturing is ended, the DAS strain rate response $$\dot{\varepsilon}_{xx}^{after}$$

after fracturing is obtained (FIG. 2b). By taking the difference between the DAS strain rate responses before and after fracturing, the time-lapse DAS response data subset $$\dot{\varepsilon}_{xx}^{TL\_syn} = \dot{\varepsilon}_{xx}^{after} - \dot{\varepsilon}_{xx}^{before}$$

(FIG. 2c) is acquired. As can be seen from FIG. 2c, the time-lapse response data subset only contains tube waves and Krauklis waves. By applying preprocessing techniques to remove the tube waves, a time-lapse DAS response data subset dominated by Krauklis waves can be acquired.

Preferably, the time-lapse DAS response data subset dominated by Krauklis waves is obtained by the technology of Steps 1-2, on the basis, the time-lapse DAS response data subset $$\dot{\varepsilon}_{xx}^{TL\_obs}$$

in the field data is acquired in the same way, based on synthetic data $$\dot{\varepsilon}_{xx}^{TL\_obs}$$

and the field data $$\dot{\varepsilon}_{xx}^{TL\_syn},$$

the objective function of TL-FWI is constructed and is shown as the following formula:

$$\delta \dot{\varepsilon}_{xx} = \dot{\varepsilon}_{xx}^{TL\_obs} - \dot{\varepsilon}_{xx}^{TL\_syn}$$
$$E(m) = \sum_{shots} \dfrac{1}{2} \int dt \sum_{receivers} \delta\dot{\varepsilon}_{xx}2.$$

Wherein, $$\delta\dot{\varepsilon}_{xx}$$

is a data residual, $$E(m)$$

is an objective function of TL-FWI, $$m$$

is a model parameter, i.e., anisotropic elastic parameters and density. A derivative $$\frac{\partial E}{\partial m}$$

of the objective function is obtained by a gradient-based algorithm and the model is updated by the following formula:

$$m_{n+1} = m_n - \mu_n \frac{\partial E}{\partial m}.$$

Wherein, $$m_n$$

is a model obtained after n-th iteration, $$m_{n+1}$$

is a new model updated based on the n-th model, and $$\mu_n$$

is an update step size. When the error of TL-FWI is less than a certain threshold, the time-lapse variation of the hydraulic fracture is obtained.

The technical solution for quantitative evaluation of the hydraulic fractures in the near-wellbore region based on the Krauklis waves and DAS can be mainly divided into four parts. The first part involves model discretization using the non-uniform grid technology. The second part focuses on obtaining the time-lapse DAS response data subset. The third part involves inverting the time-lapse DAS response data subset to acquire information on the time-lapse variation of the hydraulic fractures in the near-wellbore region. The fourth part involves quantitative evaluation on key attributes such as fracture-wellbore connectivity, extent of fracture propagation, and fracture geometry. Based on the time-lapse variation of the hydraulic fractures, key attributes such as fracture-wellbore connectivity, extent of fracture propagation, and fracture geometry can be obtained. This allows for the quantitative evaluation of hydraulic fractures in the near-wellbore region and, in turn, aids in guiding production and operational decisions and promotes further development of the hydraulic fracturing monitoring technology.

By utilizing the response directly related to the fracture attributes of the Krauklis waves, inversion of the hydraulic fractures in the near-wellbore region is conducted, thus addressing the difficulty in quantitatively evaluating the hydraulic fractures in the near-wellbore region. This advancement pushes the evaluation of the hydraulic fractures from qualitative analysis to quantitative analysis.

By employing the non-uniform grid technology to discretize the multi-scale model system of fracture-wellbore-formation, the computational cost is significantly reduced, thereby promoting the development of the numerical simulation technique for Krauklis waves.

Combining with the DAS technology, which is widely used in hydraulic fracturing monitoring at present, this technical solution breaks through the barrier that the Krauklis waves are confined to theoretical derivation and laboratory simulation, thus accelerating the process of bringing Krauklis waves into practical application.

By using the TL-FWI technology to invert the DAS response, on the one hand, the data subset dominated by the Krauklis waves can be extracted for inversion, thus significantly reducing the nonlinearity of inversion; on the other hand, by utilizing FWI, a high-precision inversion technique, to invert the fracture, detailed characterization of the fracture structure is achieved.

The technical solution proposed by the present disclosure is particularly applicable to a hydraulic fracturing manner of horizontal well section fracturing, and after each stage of fracturing ends, feedback is made on the fracturing effect, thereby helping to guide subsequent operations and production decisions, and improving single well performance and production capacity of unconventional oil and gas reservoirs.

Finally, it should be noted that the above description is merely preferred embodiments of the present disclosure, and is not intended to limit the present disclosure, and although the present disclosure has been described in detail with reference to the above-described embodiments, those skilled in the art can still modify the technical solutions described in the above-described embodiments, or make equivalent replacements for some technical features thereof. Any modification, equivalent substitution, improvement, etc. made within the spirit and principles of the present disclosure should be included within the scope of protection of the present disclosure.

What is claimed is:

1. A method for determining hydraulic fractures in the near-wellbore region, executed by a combination of a Distributed Acoustic Sensing (DAS), Krauklis wave and a computer, comprising:

Step 1, constructing a model with hydraulic fractures, a wellbore, and a formation as main components, and discretizing, by the computer, the model using non-uniform grid technology, at the same time, setting $$\delta \varepsilon_{xx}$$

as a data residual, $$E(m)$$

as an objective function of TL-FWI, $$m$$

as a model parameter, $$m_n$$

as a model obtained after n-th iteration, $$m_{n+1}$$

as a new model updated based on the n-th model, and $$\mu_n$$

as an update step size, i.e., anisotropic elastic parameters and density, wherein, in Step 1, the hydraulic fracture region is discretized using a finer grid, the wellbore region is discretized using a medium grid, and the formation region is discretized using a coarse grid;

Step 2, obtaining, by the computer, a time-lapse DAS response data subset: first, calculating a component of a particle velocity $$v_x$$

along a fiber installation direction based on an anisotropic elastic wave equation; then, determining a DAS strain rate response $$\dot{\varepsilon}_{xx}$$

by taking a derivative of the particle velocity component along a fiber direction; finally, calculating the strain rate responses before $$\dot{\varepsilon}_{xx}^{before}$$

and after $$\dot{\varepsilon}_{xx}^{after}$$

fracturing, and obtaining the time-lapse DAS response data subset $$\dot{\varepsilon}_{xx}^{TL\_syn}$$

in the synthetic data by subtracting the two, wherein the anisotropic elastic parameters are set as $$c_{11}, c_{13}, c_{33}, c_{44},$$

and the horizontal and vertical components of the particle velocity are set as $$v_x$$

and $$v_z,$$

respectively;

Step 3, after completing Step 2, inverting, by the computer, the time-lapse DAS response data subset: first, obtaining the time-lapse DAS response data subset $$\dot{\varepsilon}_{xx}^{TL\_obs}$$

from field data; then, constructing a TL-FWI error function, and calculating a gradient of an objective function using gradient-based methods; finally, updating the initial model based on the gradient of the objective function until the TL-FWI error reaches a predefined threshold, at which point the development of hydraulic fractures in the near-wellbore region is obtained; and Step 4, determining, by the computer, a fracture-wellbore connectivity, an extent of fracture propagation, and a fracture geometry of hydraulic fractures in the near-wellbore region.

2. The method for determining hydraulic fractures in the near-wellbore region according to claim 1, wherein by applying a water hammer signal at a wellhead and solving an anisotropic media elastic wave equation, horizontal component data $$v_x$$

of the particle velocity along the fiber installation direction in a horizontal well is acquired, and the DAS strain rate response $$\dot{\varepsilon}_{xx}$$

is acquired by the following formula:

$$\dot{\varepsilon}_\alpha = \frac{\partial v_x}{\partial x},$$

wherein $$\partial x$$

represents the partial derivative along the horizontal direction, i.e., the partial derivative along the fiber direction, and through the above formula, the DAS strain rate response is obtained from the anisotropic elastic wave equation.

3. The method for determining hydraulic fractures in the near-wellbore region according to claim 1, wherein, in Step 2, based on discretizing the model using non-uniform grids, the anisotropic medium elastic wave equation is used to solve for the DAS response, and the anisotropic medium elastic wave equation is expressed as follows:

$$\begin{cases} \rho\dfrac{\partial v_x}{\partial t} = \dfrac{\partial \sigma_{xx}}{\partial x} + \dfrac{\partial \sigma_{xz}}{\partial z} \\ \rho\dfrac{\partial v_z}{\partial t} = \dfrac{\partial \sigma_{zz}}{\partial z} + \dfrac{\partial \sigma_{xz}}{\partial x} \\ \dfrac{\partial \sigma_{xx}}{\partial t} = c_{11}\dfrac{\partial v_x}{\partial x} + c_{13}\dfrac{\partial v_z}{\partial z} \\ \dfrac{\partial \sigma_{zz}}{\partial t} = c_{13}\dfrac{\partial v_x}{\partial x} + c_{33}\dfrac{\partial v_z}{\partial z} \\ \dfrac{\partial \sigma_{xz}}{\partial t} = c_{44}\dfrac{\partial v_x}{\partial z} + c_{44}\dfrac{\partial v_z}{\partial x} \end{cases}.$$

4. The method for determining hydraulic fractures in the near-wellbore region according to claim 1, wherein the time-lapse DAS response data subset dominated by Krauklis waves is obtained by the technology of Steps 1-2, on the basis, the time-lapse DAS response data subset $$\varepsilon_{xx}^{TL\_obs}$$

in the field data is acquired in the same way, based on synthetic data $$\varepsilon_{xx}^{TL\_obs}$$

and the field data $$\varepsilon_{xx}^{TL\_syn},$$

the objective function of TL-FWI is constructed and is shown as the following formula:

$$\delta\varepsilon_{xx} = \varepsilon_{xx}^{TL\_obs} - \varepsilon_{xx}^{TL\_syn}$$

$$E(m) = \sum_{shots}\frac{1}{2}\int dt \sum_{receivers} \delta\varepsilon_{xx}^2;$$

and
a derivative $$\frac{\partial E}{\partial m}$$

of the objective function is obtained by a gradient-based algorithm and the model is updated by the following formula:

$$m_{n+1} = m_n - \mu_n \frac{\partial E}{\partial m}.$$

5. The method for determining hydraulic fractures in the near-wellbore region according to claim 1, wherein when the error of TL-FWI is less than a certain threshold, the time-lapse variation of the hydraulic fracture is obtained.

\* \* \* \* \*